June 21, 1927.

J. ROBINSON

CONNECTER HEAD

Original Filed April 12, 1921

1,633,227

INVENTOR
Joseph Robinson,
BY Watson, Coit,
Morse & Grindle,
ATTORNEYS

Patented June 21, 1927.

1,633,227

UNITED STATES PATENT OFFICE.

JOSEPH ROBINSON, OF NEW YORK, N. Y.

CONNECTER HEAD.

Application filed April 12, 1921, Serial No. 460,774. Renewed November 10, 1926.

The present invention relates to automatic train pipe connecter heads.

In my copending application, Serial No. 363,634, filed March 6, 1920, is disclosed a head for an automatic train pipe connecter in which the wings or guides are formed separately from the base of the head and rigidly secured thereto. This construction involves a considerable saving in manufacture, the machining operations to be performed being greatly simplified, and in addition great accuracy in the positioning of the guides is possible, the guides being located by means of a master gauge and permanently secured in the exact position desired.

The present invention is an improvement upon the invention disclosed in the prior application referred to and provides a connecter head in which the guides are secured to the base thereof by novel means with the result that the machine work required is reduced to a minimum and the time necessarily consumed in assembling the guides and base decreased while at the same time the joints are amply strong and the guides accurately positioned.

One embodiment of the invention will be disclosed, by way of example, in the following description and in the accompanying drawings in which.

Figure 1:
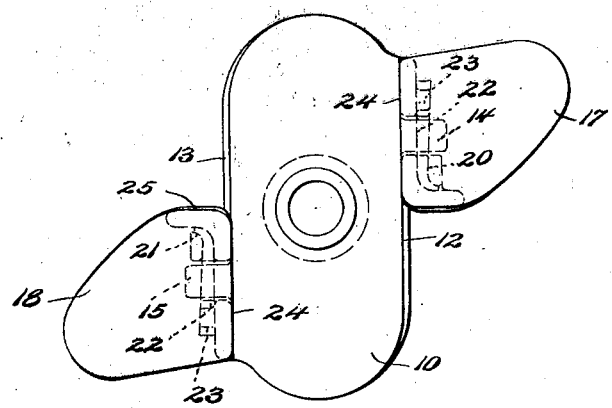
Figure 1 is a front elevation of an automatic connecter head in which separately formed guides are secured to the base portion in accordance with the present invention.

The base portion of the head is indicated at 10 in the drawings, this base portion being preferably cast with a flat face and diagonally opposed rearwardly directed flanges 11 along its edges. The surfaces of the vertical sides of the base are inclined inwardly toward the front, these inclined surfaces 12 and 13 respectively being machined to insure accuracy of surface and angle of inclination.

Projecting laterally from the base at points approximately midway vertically of flanges 11 are lugs 14 and 15 respectively, each of which is provided with a vertical aperture therethrough, of rectangular cross section and the outer wall of which is inclined. One of these apertures is illustrated at 16 in the drawings. The diagonally arranged guides are indicated at 17 and 18, these guides being preferably of forged metal and having accurately machined surfaces 17' at their rear ends adapted to fit closely against the inclined machined surfaces 12 and 13 respectively, of the base.

Figure 2:
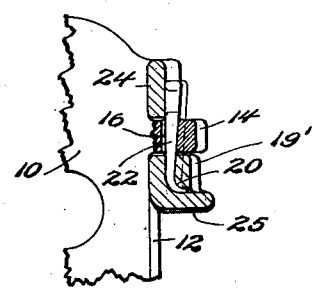
Figure 2 is a section on the line 2—2 of Figure 4.
Figure 3:
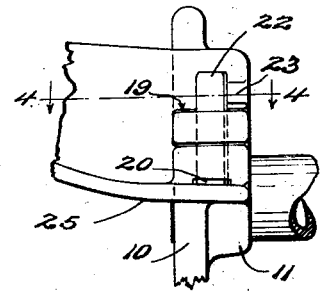
Figure 3 is a side view of a portion of the head showing the means for securing the upper wing to the base portion.
Figure 4:
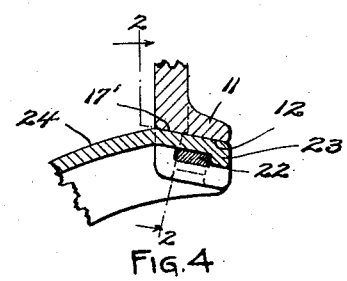
Figure 4 is a section on the line 4—4 of Figure 3.

Approximately midway of its height each guide is cut away, so that openings are provided through which the flanges 14 and 15 may respectively extend when the guides are assembled with the head. One of these apertures is illustrated at 19 in the drawings. Each guide has a thickened portion 19' adjacent the aperture mentioned, in the case of guide 17, below the aperture, and in the case of guide 18, above the aperture, and these thickened portions are provided with openings or apertures 20 and 21 respectively, each of which has one end adapted to register with the vertical tapered aperture in the adjacent laterally projecting flange of the base, and has its other end outwardly curved as shown in Figure 2. These apertures are wedge-shaped, as illustrated, and when brought into register with the apertures of flanges 14 and 15, tapered members or wedges 22 may be driven thereinto, the pointed and flexible ends of the wedges following the curvature of slots 20 and 21 so that they are permanently locked in position. In rear of the thick end of each wedge a boss or lug is formed on the guide the forward end of which bears against the wedge and prevents forward movement of the guide. In Figure 3 one of these bosses is shown at 23.

In assembling, after the abutting surfaces of the guides and base have been machined, it only remains to insert the wedges 22 to to secure the guides permanently to the base. To insure that they are properly located the head is placed against a master gauge and, if corrections are necessary, they may be quickly made by adjusting the mutually abutting bearing surfaces.

The surfaces 12 and 13 of the base 10 are tapered to the same degree, and extend practically from one end of the head to the other, the guide 18 being secured to the lower portion of the surface 13 and the guide 17 being secured to the upper portion of the surface 11. By arranging the surfaces 12 and 13 so that each is inclined to the same degree, from practically one end of the base 10 to the other, the machining necessary to produce the same and properly locate them with respect to the vertical center line of the base 10, is greatly simplified since each of these surfaces can readily be machined in one operation and with the same tool. It is to be noted that the openings 19 in the guides 17 and 18 are somewhat larger than the projection 14. This is to enable the guides to be adjusted to a master gauge as aforesaid, when assembling them on the surfaces 12 and 13, or when, by reason of wear or damage sustained in service, they require adjustment in order to insure proper fit between mating heads. When the guides are thus assembled and adjusted they are rigidly clamped in position by the key 22.

It will be understood that the surface 17 of the guides are machined to a definite relation with respect to the inclined surfaces 24 and 25, and that the guides are so secured on the base 10 as to bring these surfaces in proper relation to each other, preferably with the surfaces or faces 25 disposed approximately in a horizontal plane through the center of the base 10. The surfaces 12 and 13 extend vertically across said horizontal plane of the base 10, the guides 17 and 18 being positioned on opposite sides of this plane and diagonally spaced on the base 10. The guides extend forwardly and diverge laterally of the said base.

Having thus described the invention what I claim as new and desire to secure by Letters Patent is:

1. An automatic train pipe coupling head comprising in combination, a base having a projecting flange provided with an aperture therethrough, a guide having a recess to receive said flange and an aperture therein to be brought into register with the aperture in the flange, and a member adapted to be inserted into said registering apertures to secure the guide to the base.

2. An automatic train pipe coupling head comprising in combination, a base member, a guide member, one of said members having a recess and the other having a projection to enter said recess, and means to engage the member having the recess and to engage the projection of the other member, to lock the guide to the base.

3. An automatic train pipe coupling head comprising in combination, a base member, a guide member, one of said members having a recess and the other having a projection to enter said recess, and means to engage said projection to lock it within the recess and thereby secure the guide to the head.

4. An automatic train pipe coupling head comprising, a base member, a guide member, one of said members having a projection which has an aperture extending therethrough and the other having a recess to receive said projection, and a wedge adapted to be inserted through the aperture in the projection and to engage the member having the recess, to secure said members together.

5. An automatic train pipe coupling head comprising, in combination, a base having a laterally projecting flange provided with a vertically disposed tapering aperture therethrough, a guide having an opening therethrough to receive said flange, and a wedge adapted to be inserted through the aperture in the flange and to engage portions of the guide above and below the flange to secure the flange to the base.

6. An automatic train pipe coupling head comprising in combination, a base member, a guide member, one of said members having a projection which has an aperture extending therethrough and the other member having a recess to receive said projection and a curved aperture opening into said recess and adapted to have its mouth brought into register with the aperture extending through the projection, and a member adapted to be inserted through the aperture in the projection and to be driven into said curved aperture to secure the guide to the base.

7. An automatic train pipe coupling head comprising in combination, a base member, a guide member, said members having interengaging portions each having an aperture therein, the adjacent mouths of the apertures being in registration and one of said apertures being curved, and a member extending into each of said apertures being curved to conform to the curved aperture to lock the guide member to the base member.

8. An automatic train pipe coupling head comprising in combination, a base having a coupling face and also having at one side a surface formed at an angle to the plane of said coupling face and extending on opposite sides of a horizontal plane through the center of said head, said surfaces throughout its length being inclined to the same degree to the coupling face of the head, and a guide for said head formed separately of the head and secured on a part of said surface.

9. An automatic train pipe coupling head comprising in combination, a base having a coupling face and provided at opposite sides with a vertically extending surface formed at an angle to the plane of said face and extending above and below the horizontal central plane of said head, that portion of said surface which lies below said plane being in substantially the same plane as the portion thereof lying above said center plane, and a guide for said head formed separately of the head and secured to said surface.

10. An automatic train pipe coupling head comprising in combination, a base having a coupling face and also having at one side a surface formed at an angle to the plane of said face and extending from one side of the horizontal central plane of the base to the other side of said plane, and a guiding device for said head removably mounted on a part of said surface.

11. An automatic train pipe coupling head comprising in combination, a base having at opposite sides a vertically extending surface extending above and below the horizontal central plane of said head, that portion of said surface which lies below said plane being in substantially the same plane as the portion thereof lying above said plane, and a guide for said head adjustably secured to a part of said surface.

In testimony whereof I hereunto affix my signature.

JOSEPH ROBINSON.